(12) United States Patent
Zalunin et al.

(10) Patent No.: US 9,615,111 B2
(45) Date of Patent: Apr. 4, 2017

(54) COMPLEXITY-ADAPTIVE COMPRESSION OF COLOR IMAGES USING BINARY ARITHMETIC CODING

(71) Applicant: EMC Corporation, Hopkinton, MA (US)

(72) Inventors: Vasily Olegovich Zalunin, St. Petersburg (RU); Marat Ravilevich Gilmutdinov, St. Petersburg (RU); Nikolay Dmitrievich Egorov, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/771,703

(22) PCT Filed: Sep. 29, 2014

(86) PCT No.: PCT/RU2014/000732
§ 371 (c)(1),
(2) Date: Aug. 31, 2015

(87) PCT Pub. No.: WO2016/053128
PCT Pub. Date: Apr. 7, 2016

(65) Prior Publication Data
US 2016/0366446 A1      Dec. 15, 2016

(51) Int. Cl.
*G06K 9/36*      (2006.01)
*H04N 19/91*      (2014.01)
(Continued)

(52) U.S. Cl.
CPC .............. *H04N 19/91* (2014.11); *H04N 19/13* (2014.11); *H04N 19/182* (2014.11); *H04N 19/186* (2014.11)

(58) Field of Classification Search
USPC ......... 382/166, 162, 112; 1/1; 101/183, 211; 345/87, 101, 102, 428; 348/222.1, 428;
(Continued)

(56) References Cited

U.S. PATENT DOCUMENTS

| 7,652,792 B2 * | 1/2010 | Honeck | B41F 31/045 |
| | | | 101/183 |
| 7,969,613 B2 * | 6/2011 | Honeck | B41F 31/045 |
| | | | 358/1.17 |

(Continued)

*Primary Examiner* — Anh Do
(74) *Attorney, Agent, or Firm* — BainwoodHuang

(57) ABSTRACT

An improved technique of compressing image data involves separating a prediction error of image data into distinct factors and applying a separate set of context models to each factor. Such factors may take the form of a sign, a bit category, and a relative absolute value of the prediction error. For each factor, the improved technique provides a set of context models and a procedure for selecting a context model from each respective set. The context model for each factor determines a probability distribution of symbols that may represent that factor, which in turn enables compression of the prediction error. Additionally, the symbols that represent certain factors into which the prediction error is separated result from a binary representation whose form—either unary or uniform—depends on the size of the prediction error.

20 Claims, 9 Drawing Sheets

(51) Int. Cl.
*H04N 19/13* (2014.01)
*H04N 19/182* (2014.01)
*H04N 19/186* (2014.01)

(58) Field of Classification Search
USPC ..... 358/1.9, 1.17, 1.18; 375/240.19, 240.03; 399/24
See application file for complete search history.

(56) References Cited

U.S. PATENT DOCUMENTS

| | | | |
|---|---|---|---|
| 8,582,988 B2 * | 11/2013 | Rapkin | G03G 15/55 399/24 |
| 2003/0058481 A1 | 3/2003 | Bossen | |
| 2004/0071356 A1 | 4/2004 | Sudharsanan et al. | |
| 2008/0037880 A1 | 2/2008 | Lai | |

* cited by examiner

BC Binarization 220

Unary Representation of BC 610

*FIG. 6A*

RAV Binarization 222

BC > BC_Threshold? 620
No → Unary Representation of Rel Abs Value 630
Yes → Uniform Representation of Rel Abs Value 640

*FIG. 6B*

COMPLEXITY-ADAPTIVE COMPRESSION OF COLOR IMAGES USING BINARY ARITHMETIC CODING

BACKGROUND

Compression of image data in a computerized system allows the system to store more image data in the same amount of storage space. Typically, such compression involves removing redundant information from the image data. In a lossless compression scheme, the redundant information is removed in a way that, upon decompression of the compressed image, the original image is restored in full.

A computerized system may achieve lossless compression of color image data by applying a prediction model (e.g., inter-component prediction) to each color component of the image data and an arithmetic coding scheme to a prediction error, i.e., a deviation of the prediction model from the image data. The arithmetic coding scheme expresses the prediction error at each pixel using a set of symbols (e.g., binary words). The computerized system compresses the prediction error by retaining only those symbols that have the highest frequency of occurrence in the image data. In applying the arithmetic coding scheme to the prediction error, the computerized system applies a set of context models, each of which dictate a different approach to computing a frequency distribution for the set of symbols at each pixel.

SUMMARY

In order to achieve an acceptable compression ratio, conventional compression schemes apply a large number of context models to a prediction error of image data. Such a large number of context models reflect complicated relationships between values of the prediction error across pixels of the image data. Unfortunately, the large number of context models leads to compression schemes that are accordingly complex and difficult to implement.

In contrast with the above-described conventional compression schemes, an improved technique of compressing image data involves separating a prediction error of image data into distinct factors and applying a separate set of context models to each factor. Such factors may take the form of a sign, a bit category, and a relative absolute value of the prediction error. For each factor, the improved technique provides a set of context models and a procedure for selecting a context model from each respective set. The context model for each factor determines a probability distribution of symbols that may represent that factor, which in turn enables compression of the prediction error. Additionally, the symbols that represent certain factors into which the prediction error is separated result from a binary representation whose form—either unary or uniform—depends on the size of the prediction error.

Advantageously, the improved technique breaks a large computing task into smaller computing tasks that are more efficient to compute overall, and enables compression algorithms that are simpler to implement than conventional algorithms. Furthermore, because the binarization of the relative absolute value depends on the size of the prediction error, the compression is complexity-adaptive and remains simple even as the prediction error grows.

One embodiment is directed to a method of compressing single color image data stored in memory. The method includes generating a prediction error equal to a difference between the single color image data at that pixel and a predicted value of the single color image data at that pixel. The method also includes separating the prediction error into multiple factors. The method further includes selecting a respective context model for each of the multiple factors into which the prediction error at that pixel has been separated. The method further includes encoding the prediction error based on the context model selected for each of the multiple factors to generate compressed image data.

Additionally, some embodiments are directed to a system constructed and arranged to compress single color image data stored in memory. The system includes memory and a controller including controlling circuitry constructed and arranged to carry out a method of compressing single color image data stored in memory.

Further, some embodiments are directed to a computer program product having a non-transitory, computer readable storage medium that stores instructions which, when executed by a computer, cause the computer to carry out the method of compressing single color image data stored in memory.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 6A is a flow chart illustrating an example binarization of the bit category illustrated in FIG. 2.

FIG. 6B is a flow chart illustrating an example binarization of the relative absolute value illustrated in FIG. 2.

DETAILED DESCRIPTION

An improved technique for performing lossless compression of image data involves separating a prediction error of the image data into distinct factors and applying a separate set of context models to each factor. Additionally, the symbols that represent certain factors into which the prediction error is separated result from a binary representation whose form—either unary or uniform—depends on the size of the prediction error. Advantageously, the improved technique breaks a large computing task into smaller computing tasks that are more efficient to compute overall, and enables compression algorithms that are simpler to implement than conventional algorithms. Furthermore, because the binary symbols used in the compression result from a binarization that depends on the size of the prediction error, the compression is complexity-adaptive and remains simple even as the prediction error grows.

Figure 1:
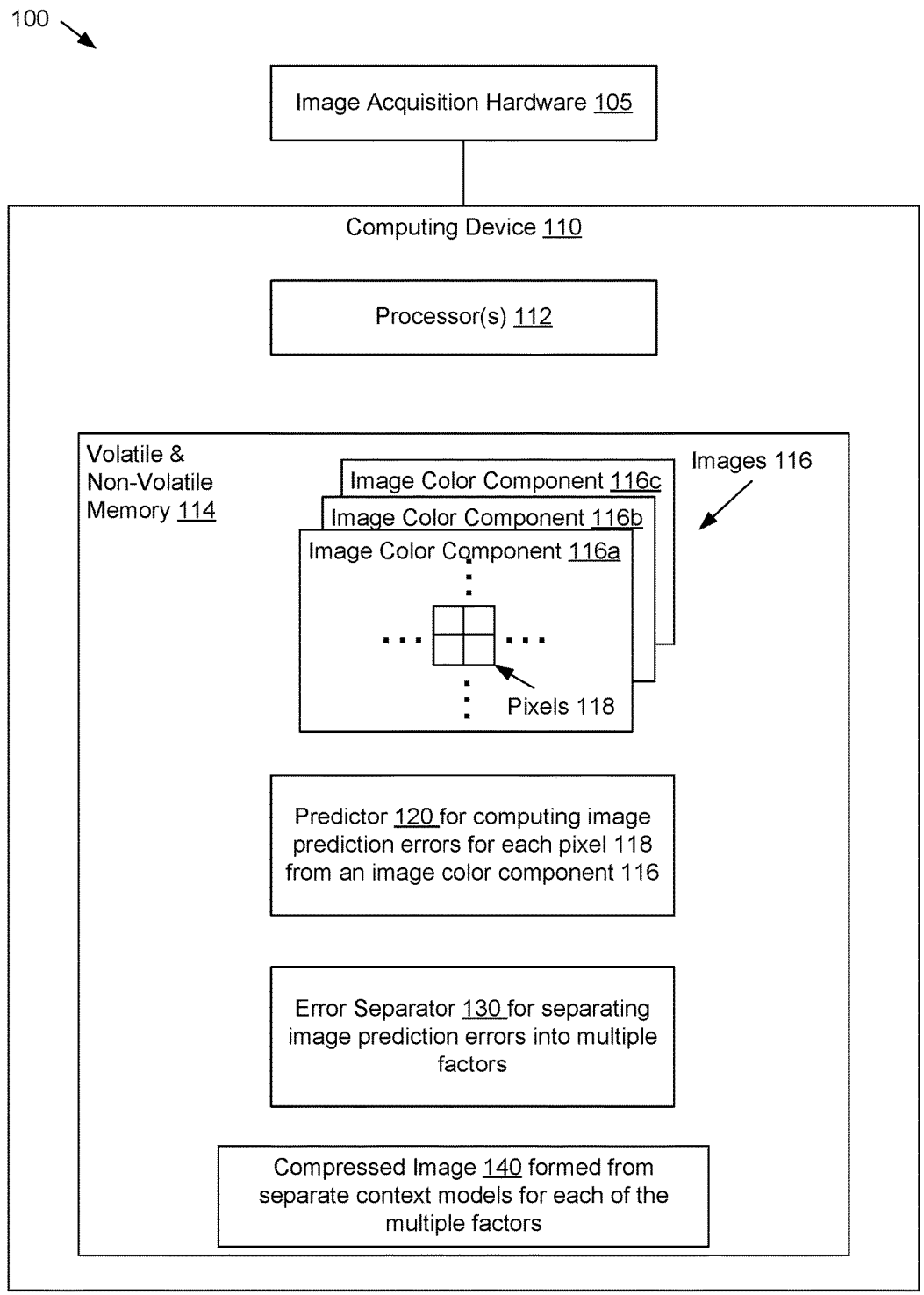
FIG. 1 is a block diagram illustrating an example electronic environment in which the improved technique can be carried out.

FIG. 1 shows an example electronic environment 100 in which embodiments of the improved technique hereof can be practiced. Electronic environment 100 includes image acquisition hardware 105 and a computing device 110.

The image acquisition hardware 105 may be any hardware that obtains images 116 for storage within computerized device 110. In an example, the image acquisition hardware 105 may be implemented as a camera, MRI device, x-ray machine, or other image-producing equipment.

The computing device 110 may be any electronic system capable of storing images 116 acquired by the image acquisition hardware 105 and performing compression operations on the images 116. For example, the computing device 110 may be implemented using a desktop computer, a laptop computer, tablet computer, smartphone, or the like. The computing device 110 includes processor(s) 112 and memory 114.

The processor 112 includes one or more processing chips and/or assemblies. In a particular example, the processor 112 includes a multi-core CPU. The memory 114 includes both volatile memory (e.g., RAM), and non-volatile memory, such as one or more ROMs, disk drives, solid state drives, and the like. The processor 112 and the memory 114 together form control circuitry, which is constructed and arranged to carry out various methods and functions as described herein.

The memory 114 is seen to include images 116, which in this case are color images having color component data 116(a), 116(b), 116(c). For example, the image color components 116(a-c) may represent red, green, and blue (RGB) components, respectively. In other arrangements, however, the images 116 may be a single, monochromatic image. Also, each of the color components 116(a-c) thus may be regarded as a monochromatic image for their respective color.

The image data 116 contains numerical data representing a brightness, or weight, at pixels 118 representing discrete spatial positions on a two-dimensional grid. The numerical data may take the form of 8-bit unsigned integers (i.e., between 0 and 255), although they may also have other bit sizes (e.g., 4-bit, 16-bit) and formats (e.g., floating-point values).

The memory 114 is also seen to store a compressed image 140 that is the result of compression operations according to the improved techniques described herein. The compressed image 140 occupies less storage space than the image data 116 from which it was derived.

The memory 114 also includes a variety of software constructs realized in the form of executable instructions, such as predictor 120 and error separator 130. When the executable instructions are run by the processor 112, the processor 112 is caused to carry out the operations of the software constructs. Although certain software constructs are specifically shown and described, it is understood that the memory 114 typically includes many other software constructs, which are not shown, such as an operating system, various applications, processes, and daemons, for example.

During operation, the image acquisition hardware 105 acquires an image 116 and the computing device 110 stores the image 116 in the memory 114. The predictor 120 generates a predicted image according to an inter-component prediction model, from which the processor subtracts the values in the image 116 to produce a prediction error.

The error separator 130 causes the processor 112 to separate the image 116 into multiple, predetermined factors at each pixel 118. For each of the multiple factors, the processor 112 selects a context model and determines a set of binary symbols. Each context model determines a probability distribution of each of the set of binary symbols. By discarding symbols that have the smallest probabilities in a distribution, the processor 112 forms the compressed image 140 from the remaining binary symbols. This compression is lossless.

Figure 2:
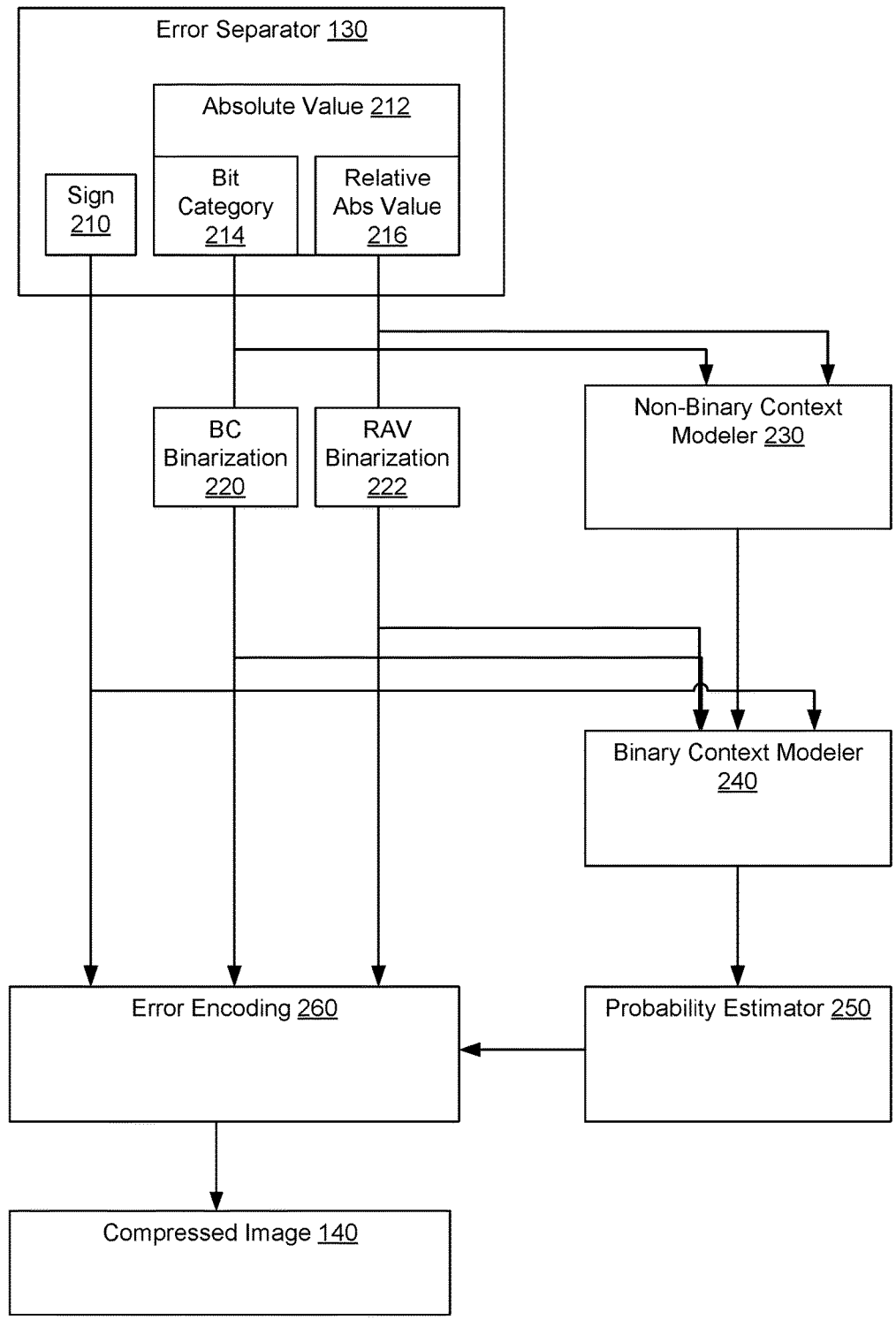
FIG. 2 is a block diagram illustrating an example context model selection carried out within the electronic environment shown in FIG. 1.

FIG. 2 shows further detail of the error separator 130, as well as the multiple factors into which the processor 112 (see FIG. 1) separates the prediction error, the context models for each of the factors, and the probability estimation 250 used by the error encoding 260 to derive the compressed image 140.

The error separator 130 is seen to separate the prediction error into two initial factors: a sign factor 210 of the prediction error and the absolute value factor 212 of the prediction error (|error|). The error separator 130 is also seen to separate the absolute value 212 into two more specific factors: a bit category (BC) factor 214 and a relative absolute value (RAV) factor 216. The BC 214 is equal to the most significant bit of the prediction error, or $\lfloor \log_2|\text{error}| \rfloor + 1$. The RAV 216 is given by $|\text{error}| - 2^{BC-1}$. It should be clear that both the BC 214 and the RAV 216 are nonnegative quantities.

The processor 112 then selects respective context models for each of the factors of sign 210, BC 214, and RAV 216. It should be understood that there is a different procedure for context model selection for each of these factors. For example, for some of the factors, e.g., BC 214 and RAV 216, a context model selection process involves a non-binary context modeler 230 and a binary context modeler 240. For these factors, the non-binary context modeler 230 identifies a particular set of binary context models to be selected by the binary context modeler 240. The context model selection process 200 for the sign factor 210, however, involves only the binary context modeler 240.

The non-binary context modeler 230 causes the processor 112 to select a non-binary context model for each of the BC 214 and the RAV 216 factors. In some arrangements, the selection of such a non-binary context model is realized in the computation of a non-binary context model index. In such arrangements, the non-binary context model index is used to select a set of binary context models, one of which is to be selected by the processor 112 using the binary context modeler 240.

The binary context modeler 240 causes the processor 112 to select a binary context model for each of the sign 210, BC 214, and the RAV 216 factors. The binary context model selected for each of these factors is provided as input to a probability estimator 250, which causes the processor 112 to compute a probability distribution of binary symbols in which the prediction error may be expressed.

BC binarization 220 and RAV binarization 222 each perform respective binarization operations on BC 214 and RAV 216 to produce binarized BC and RAV values. Processor 112 provides these binarized values as input into an error encoder 260. The error encoder 260 uses the binary symbols having the highest probability distributions and represents the sign 210 and binarized BC and RAV values using those binary symbols to construct the compressed image 140.

Figure 3:
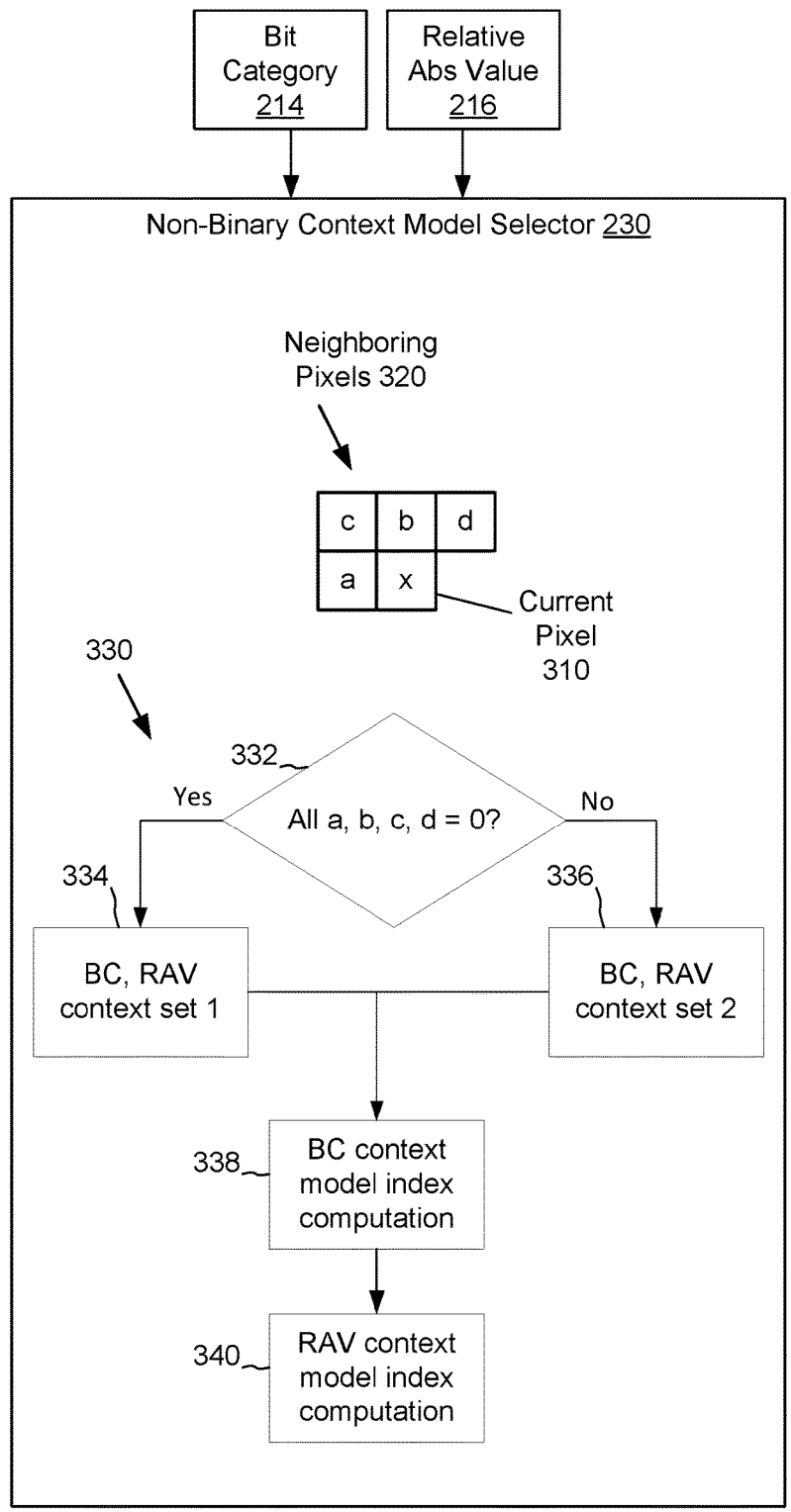
FIG. 3 is a flow chart illustrating an example non-binary context model selection carried out as part of the context model selection shown in FIG. 2.

FIG. 3. shows the non-binary context modeler 230 in further detail. Specifically, FIG. 3 depicts a scenario in which the output of the non-binary context modeler 230 includes indices for some ordered set of BC non-binary context models and RAV non-binary context models. As discussed in connection with FIG. 2, the BC value 214 and the RAV value 216 are input into the non-binary context modeler 230.

In this scenario, the non-binary context modeler 230 performs a test 330 to determine whether a set of previous, neighboring pixels all have prediction error values of zero. If these neighboring pixels do have a prediction error of zero, then processor 112 selects BC and RAV non-binary context models from a first set of context models; otherwise, processor 112 selects BC and RAV non-binary context models from a second, distinct set of context models.

It should be understood that "previous" pixels as described above are determined by the order in which processor 112 reads the prediction error values. Typically, the processor 112 reads such values in a raster scan order, from top left to bottom right. In this case, when a current pixel 310 is labeled as "x", the neighboring pixels 320, labeled "a", "b", "c", and "d", are to the west, north, northwest, and northeast of "x", respectively.

The test 330 involves determining whether all of the prediction errors at neighboring pixels 320, i.e., "a", "b", "c", and "d", are all zero. If the neighboring pixels 320 are all zero, then, at 334, the processor 112 selects context sets for BC and RAV from a first set of context models. If at least one of the neighboring pixels 320 is nonzero, then, at 336, the processor 112 selects context sets for BC and RAV from a second set of context models distinct from the first set.

Regardless of the set from which the BC and RAV non-binary context sets are selected, the processor 112 is ready to make the selection of the respective context sets. At 338, the processor computes a BC context model index, which identifies a BC non-binary context model in an ordered set of context models. At 340, the processor uses the BC non-binary context model index to compute a RAV non-binary context model index, which identifies a RAV non-binary context model in another ordered set of context models.

Figure 4:
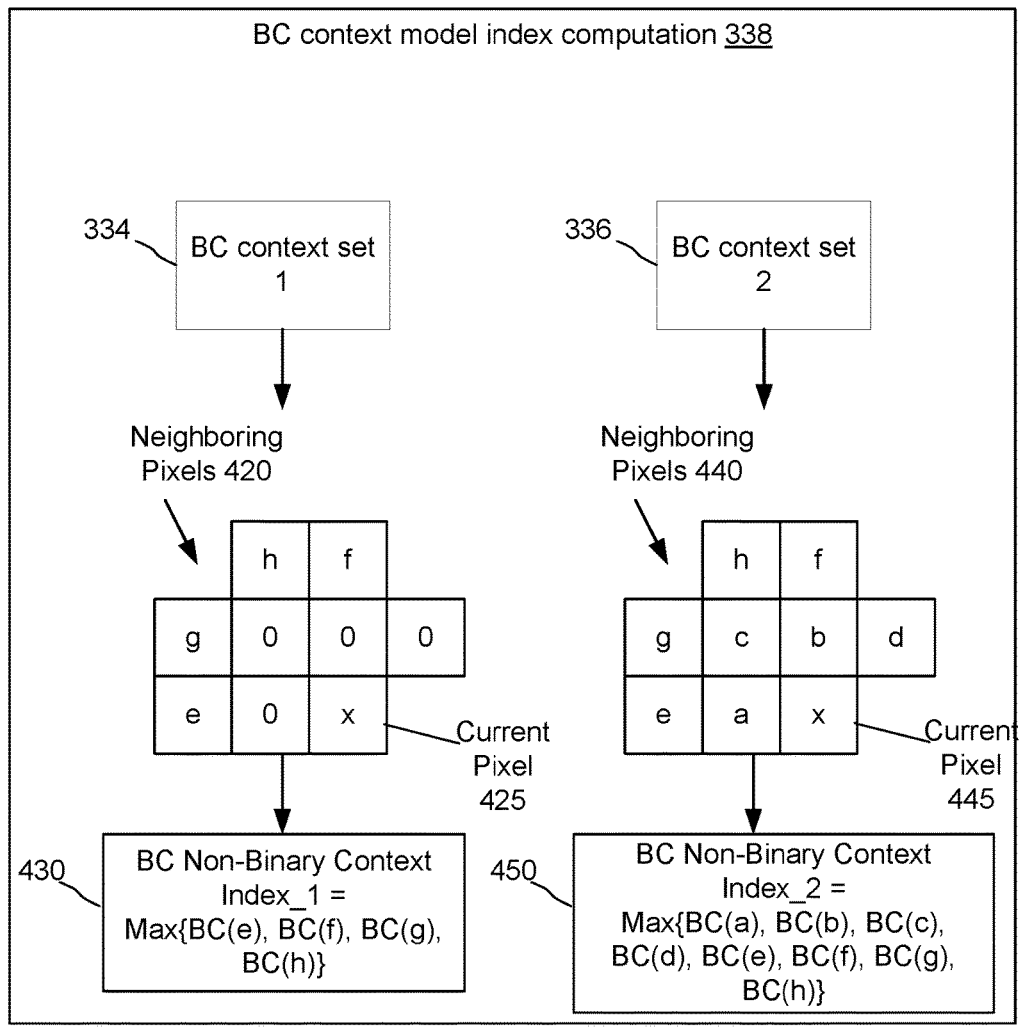
FIG. 4 is a flow chart illustrating an example bit category context model selection carried out as part of the non-binary context model selection shown in FIG. 3.

FIG. 4 shows additional detail for the BC non-binary context model index computation at 338 (FIG. 3). As shown in FIG. 4, the index computation at 338 depends on whether the BC non-binary context model is selected from the first set 334 or the second set 336.

When the BC non-binary context model is selected from the first set 334, the processor 112 determines the BC value at neighboring pixels 420 with respect a current pixel 425 ("x"). In this case, the neighboring pixels include the pixel "e" adjacent to "a" to the west, the pixel "g" adjacent to "c" to the west, the pixel "h" adjacent to "c" to the north, and the pixel "f" adjacent to "b" to the north. (See FIG. 3 for depictions of pixels "a", "b", "c", and "d"). The BC non-binary context model index 430 is then set equal to the maximum BC value at the "e", "f", "g", and "h" pixels.

When the BC non-binary context model is selected from the second set 336, however, the "a", "b", "c", and "d" pixels do not necessarily have zero prediction error. In this case, the BC non-binary context model index 450 is made to equal the maximum BC value for the "a", "b", "c", "d", "e", "f", "g", and "h" pixels.

Figure 5:
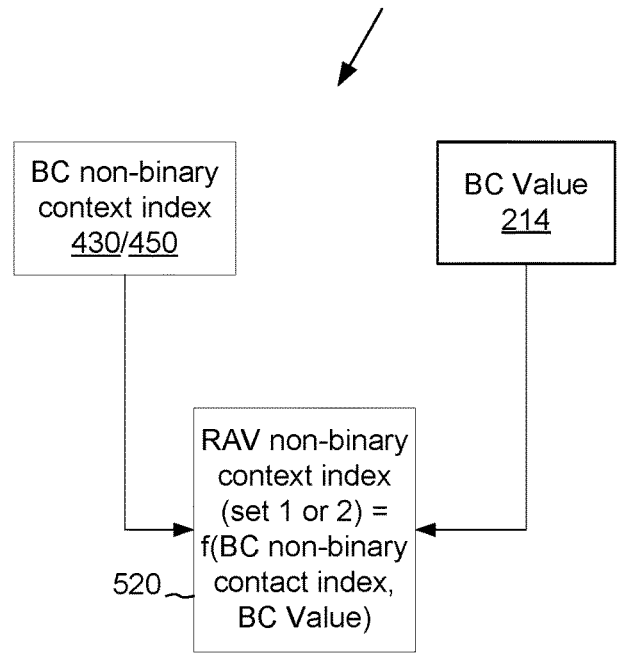
FIG. 5 is a flow chart illustrating an example relative absolute value context model selection carried out as part of the non-binary context model selection shown in FIG. 3.

FIG. 5 shows additional detail in connection with the RAV non-binary context model index computation at 340 (FIG. 3). As shown in FIG. 5, the RAV non-binary context model index 520 is a function of both the BC value 214 at the current pixel ("x") and the BC non-binary context model index 430 or 450, depending on whether the BC non-binary context set was selected from the first set 334 or the second set 336.

As discussed above, the indices of the BC and RAV non-binary context models 430/450 and 520, respectively, are some of the inputs into the binary context model selector 240. Other inputs into the binary context model selector 240 include binarized values of the BC 214 and the RAV 216. The binarization of these values and their introduction into the binary context model selector 240 are now discussed in connection with FIGS. 6A, 6B, and 7.

FIG. 6A shows detail of the BC binarization operation 220 (FIG. 2). As shown in FIG. 6A, the BC binarization operation 220 involves providing a unary representation 610 of the BC value 214. Specifically, the unary value takes the following form of a number of zeroes equal to the BC value 214 with a one in the right-most place. For example, when BC=4, the unary representation 610 takes the form 0001. When BC=2, the unary representation 610 takes the form 01. When BC=8, the unary representation 610 takes the form 000000001.

FIG. 6B shows detail of the RAV binarization operation 222 (FIG. 2). As shown in FIG. 6B, the binary representation of the RAV value 216 depends on the BC value 214. At step 620, the RAV binarization operation 222 determines whether the BC value 214 is greater than a threshold value of the BC. If the BC value 214 is not greater than the threshold value of the BC, then the processor 112 computes a unary representation 630 of the RAV value. If the BC value 214 is greater than the threshold value of the BC, then the processor computes a uniform representation 640 of the RAV value. The uniform representation of the RAV value 216 is the usual binary representation of the RAV value 216 with zero pads so that the resulting binary has a number of digits equal to the maximum BC value, as determined by the number of bits in the image data, e.g., BC_max=8 when the image data is 8-bit. For example, if the max BC value is 8, the threshold is 5, and the RAV value 216 is 100, then the uniform representation of the RAV is 01100100.

Figure 7:
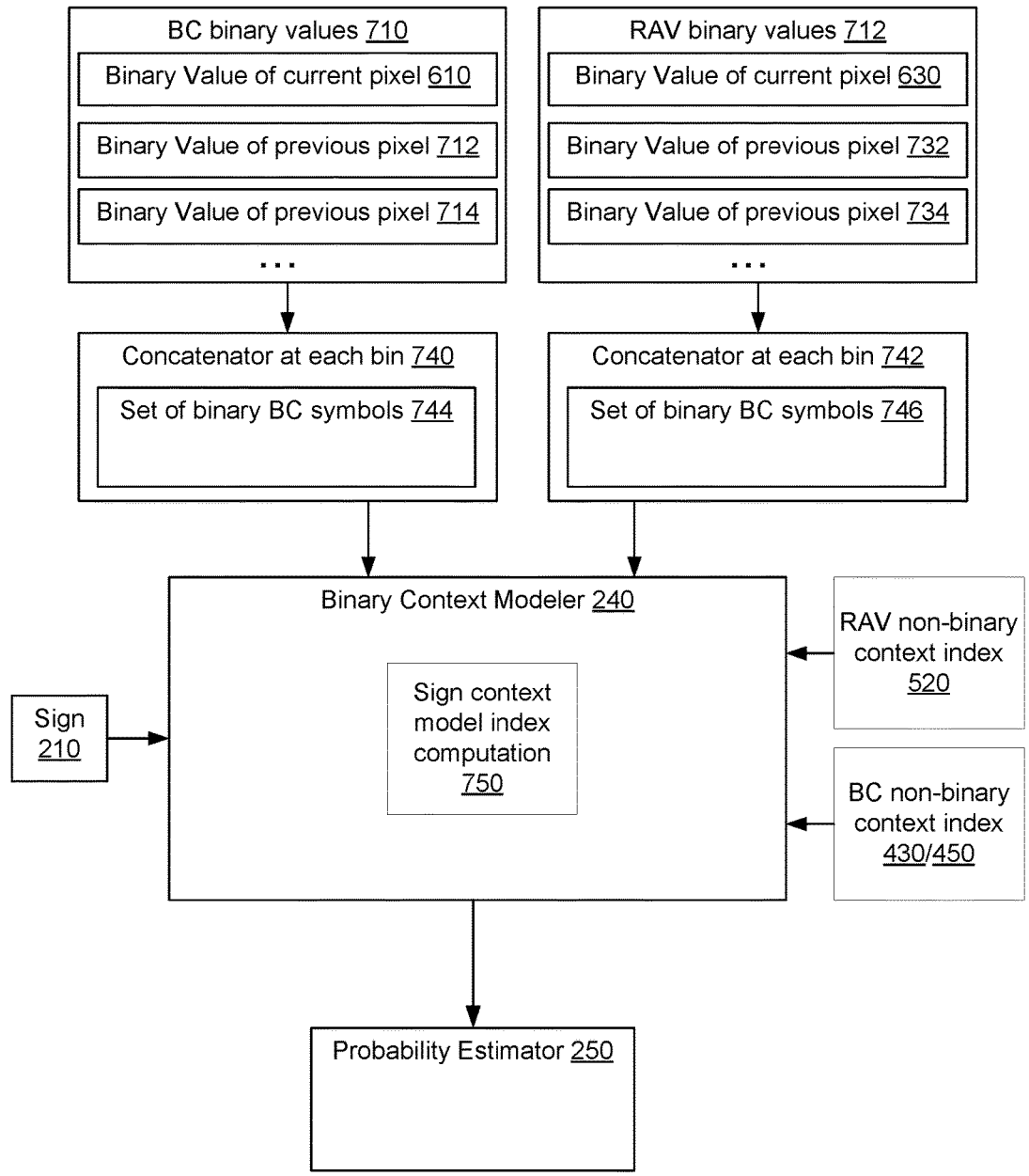
FIG. 7 is a block diagram illustrating an example binary context model selection carried out as part of the context model selection shown in FIG. 2.

FIG. 7 shows details of the binary context modeler 240. As described above, inputs to the binary context modeler 240 include the sign value 210 (which does not need binarization as it is already a binary value), the BC non-binary context index 430/450, and the RAV non-binary context index 520.

Also input into the binary context modeler 240 are sets of binary symbols 742 and 746 representing BC and RAV values, respectively, across the pixels 118 (FIG. 1). The processor 112 derives such binary symbols from the respective binary representations of BC and RAV at a current pixel and previous pixels, e.g., previously-read pixels in a raster scan pattern. For example, consider a set of BC binary values 710, including the BC binary value 610 at the current pixel, along with a BC binary value 712 at a first previous pixel, a BC binary value 714 at a second previous pixel, and so on. The processor 112 derives binary symbols 742 from these binary values on a per-digit, or "bin", basis by performing a digit-by-digit concatenation 740 of the binary values.

As an example, consider the sequence of BC values 5, 3, 7, having respective binary values 00001, 001, and 00000001. The concatenation process 740 described above results in the following:

```
0 0 0 0 0 1
0 0 0 1
0 0 0 0 0 0 0 1
```

Reading down columns of bits, the processor 112 derives the following binary symbols 742 to represent these BC values: {000,000,000,010,00,10,0,1}.

The processor 112 performs similar operations for RAV binary values 712, including the binary RAV value 630 at the current pixel and previous RAV values 732, 734, and so on, which are concatenated at 742 to produce a set of RAV binary symbols 746.

The binary context model selector 240 also selects a context model for the sign value 210 at 750. Once the sign context model has been selected, e.g., in the form of a sign context model index, and the binary context models for BC and RAV have been selected, then the processor 112 may make probability estimates at 250 (FIG. 2) for the binary context symbols for sign, BC, and RAV.

It should be understood that it is possible to determine the number of binary context models for the BC and RAV factors at this point. For example, in the case of an 8-bit image, the number of BC binary context models is 9. The number of RAV binary context models, however, depends on the BC value and BC threshold. For the example of the threshold=5, then the number of RAV binary models is according to Table 1 below.

TABLE 1

Values of BC and ranges of values of RAV relative to ranges of the absolute value of the prediction error, as well as the number of RAV models for each value of BC. Assumes BC = 8 and threshold = 5.

| \| Error \| | BC | RAV | # RAV Models |
|---|---|---|---|
| 1 | 1 | — | — |
| 2 . . . 3 | 2 | 0 . . . 1 | 1 |
| 4 . . . 7 | 3 | 0 . . . 3 | 3 |
| 8 . . . 15 | 4 | 0 . . . 7 | 7 |
| 16 . . . 31 | 5 | 0 . . . 15 | 15 |
| 32 . . . 63 | 6 | 0 . . . 31 | 5 |
| 64 . . . 127 | 7 | 0 . . . 63 | 6 |
| 128 . . . 255 | 8 | 0 . . . 127 | 7 |

A cursory inspection of Table 1 reveals that, even as the BC value 214 grows, the number of possible RAV models remains small. This is due to the binarization of the RAV value 216 involving the uniform representation rather than the unary representation beyond the threshold BC. In this way, the compression scheme described here is complexity-adaptive in that the number of binary context models grows very slowly with a large prediction error.

To find the total number of binary context models, the processor 112 performs the sign context model selection 750.

Figure 8:
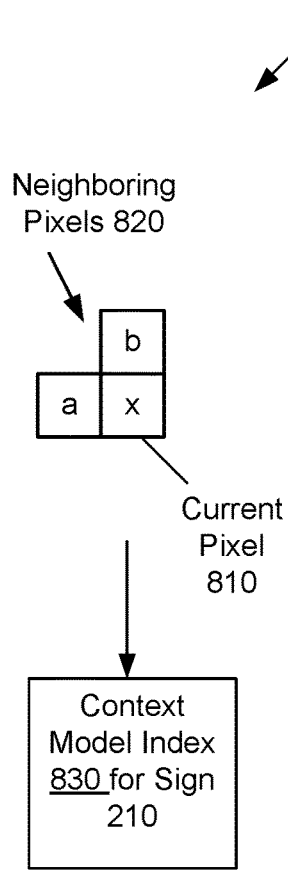
FIG. 8 is a flow chart illustrating an example sign context model selection carried out as part of the binary context model selection shown in FIG. 7.

FIG. 8 shows detail of the sign context model selection 750. Specifically, the processor 112 considers the sign of the prediction errors at neighboring pixels 820 "a" and "b" relative to the current pixel 810 (see, for example, FIG. 3). Each of the sign values at these pixels can take one of three values: −1, 0, and 1. The computation of an index for the sign context model is accomplished by choosing one of the 3×3=9 possibilities according to, e.g., a concatenation of the signs to realize the context model index for sign 830. In this way, the total number of context models is seen to be 9+2×9×(26+18)=945. The first 9 is for the number of sign context models. The 26+18 is the total number of RAV context models over all values of BC, the other 9 is for the number of BC non-context models, and the 2 is the number of non-zero sign values.

Figure 9:
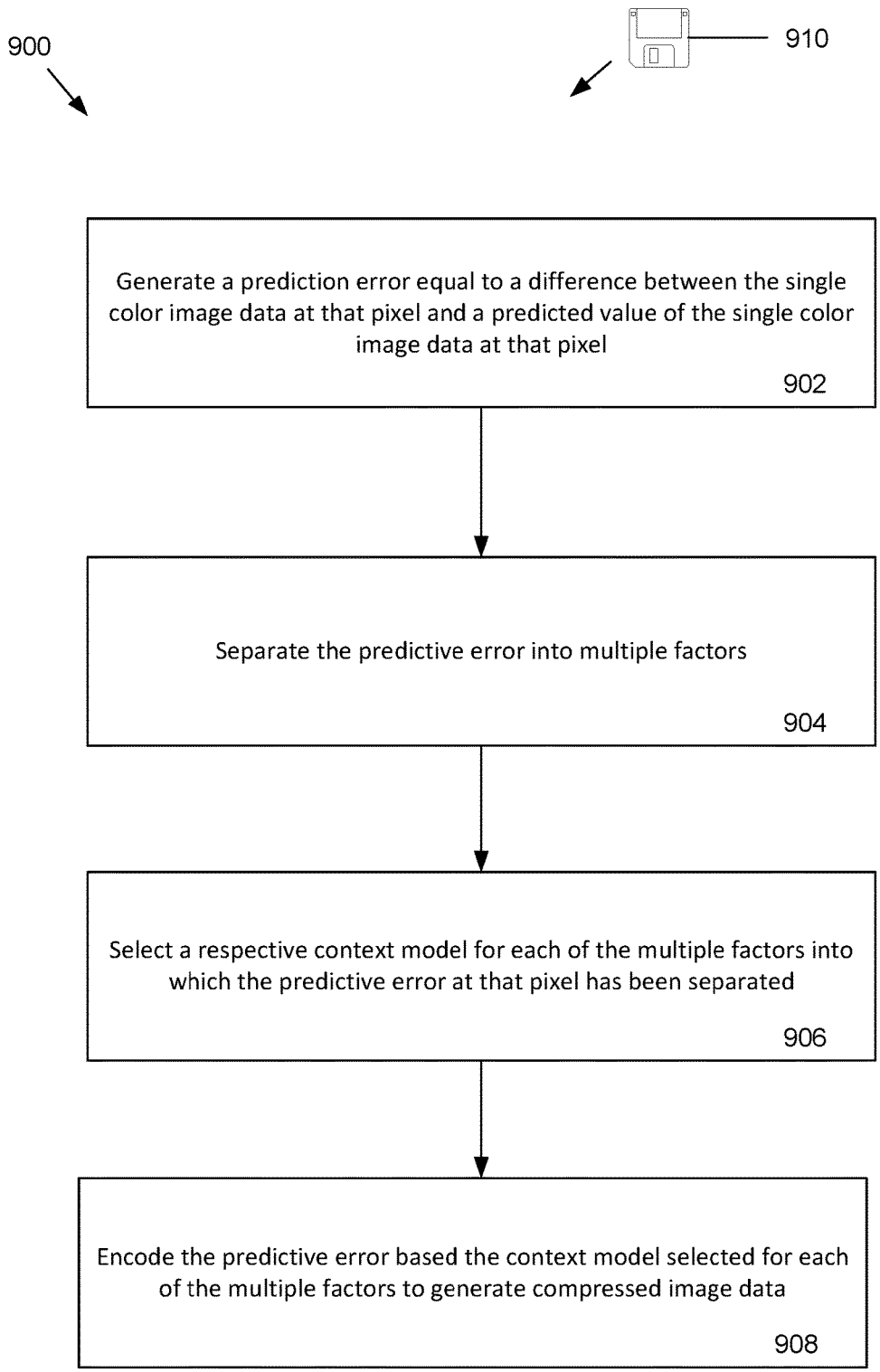
FIG. 9 is a flow chart illustrating an example method of compressing single color image data stored in memory within the electronic environment shown in FIG. 1.

FIG. 9 illustrates a method 900 of compressing single-color image data stored in memory. At 902, a processor coupled to the memory generates a prediction error equal to a difference between the single color image data at that pixel and a predicted value of the single color image data at that pixel. For example, the predictor 130 causes processor 112 coupled to the memory 114 to generate a prediction error for each pixel 118 of a color component of image data 116.

At 904, the prediction error is separated into multiple factors. For example, the separator 130 causes the processor 112 to separate the prediction error into the sign 210, BC 214, and RAV 216 factors.

At 906, a respective context model is selected for each of the multiple factors into which the prediction error at that pixel has been separated. For example, the binary context modeler 240 causes the processor 112 to select binary context models for each of the sign, BC, and RAV factors depending on the non-binary context models selected for the BC and RAV factors (e.g., via non-binary context modeler 230).

At 908, the prediction error is encoded based on the context model selected for each of the multiple factors to generate compressed image data. For example, the binary context models selected for the sign, BC, and RAV factors determine respective probability distributions for binary symbols representing the sign, BC, and RAV values at each pixel. The encoder 260 chooses those symbols that have a high enough probability of occurrence to represent their respective factors and encodes these factors using only those symbols to produce the compressed image 140.

An improved technique has been disclosed that involves separating the prediction error of image data into distinct factors and applying a separate set of context models for each factor. Advantageously, the improved technique targets correlations in image prediction errors to reduce the number of context models and to adapt the complexity of the binary representations to the image at hand.

Having described certain embodiments, numerous alternate embodiments or variations can be made. For example, while a color image having multiple color components 116(*a-c*) is shown in FIG. 1, the improved techniques apply to a monochromatic image as well.

Furthermore, it should be understood that some embodiments are directed to computing device 110 containing processor 112, which is constructed and arranged to compress single color image data stored in memory. Some embodiments are directed to a process of compressing single color image data stored in memory. Also, some embodiments are directed to a computer program product that enables computer logic to cause a computer to compress single color image data stored in memory.

In some arrangements, processor 112 is implemented by a set of cores or other types of control/processing circuitry running software. In such arrangements, the software instructions can be delivered, within storage processor 112, either in the form of a computer program product 910, or simply instructions on disk or pre-loaded in memory 114 of computing device 110, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

What is claimed is:

1. A method of compressing single color image data stored in memory, the method comprising, for each of a set of pixels of the single color image data:
    generating, by a processor coupled to the memory, a prediction error equal to a difference between the single color image data at that pixel and a predicted value of the single color image data at that pixel;
    separating the prediction error into multiple factors;
    selecting a respective context model for each of the multiple factors into which the prediction error at that pixel has been separated; and
    encoding the prediction error based on the context model selected for each of the multiple factors to generate compressed image data.

2. A method as in claim 1, wherein the multiple factors include (i) a sign of the prediction error at the respective pixel and (ii) an absolute value of the prediction error at that pixel; and
    wherein selecting the context model for each of the multiple factors includes:
        selecting a first context model for the sign of the prediction error at that pixel; and
        selecting a second context model for the absolute value of the prediction error at that pixel.

3. A method as in claim 2, wherein selecting the first context model for the sign of the prediction error at that pixel includes identifying, as the first context model, a context model of a set of sign context models based on respective signs of prediction errors at a pixel adjacent to and to the west of that pixel and at a pixel adjacent to and to the north of that pixel.

4. A method as in claim 2, wherein separating the prediction error into multiple factors includes representing the absolute value of the prediction error as a pair including (i) a bit category of the prediction error and (ii) a relative absolute value of the prediction error, the bit category being the most significant bit of the absolute value of the prediction error, the relative absolute value being a difference between (i) the absolute value of the prediction error and (ii) a minimum value of the prediction error over all values of the prediction error having the bit category; and
    wherein selecting the second context model for each pixel includes:
        selecting a third context model for the bit category of the prediction error at that pixel; and
        selecting a fourth context model for the relative absolute value of the prediction error at that pixel.

5. A method as in claim 4, wherein selecting the third context model for the bit category of the prediction error at each pixel includes:
    testing whether the prediction errors at pixels from a group of pixels are all zero to produce a testing result
    identifying one of a first set of bit category context models and a second set of bit category context models from which the third context model may be selected, the group of pixels containing the pixels adjacent to that pixel to the west, north, northwest, and northeast; and
    identifying, as the third context model, a context model of one of the first set of bit category context models and the second set of bit category context models based on the testing result.

6. A method as in claim 4, wherein selecting the third context model for the bit category of the prediction error at that pixel includes generating a maximum of bit categories at a set of neighboring pixels, the set of neighboring pixels containing the pixels adjacent to that pixel to the west (W), north (N), northwest (NW), and northeast (NE), the set of neighboring pixels further containing the pixel adjacent to W to the west, the pixel adjacent to NW to the west, the pixel adjacent to N to the north, and the pixel adjacent to NW to the north.

7. A method as in claim 6, wherein selecting the fourth context model for the relative absolute value of the prediction error includes selecting the fourth context model based on i) the third context model for the bit category of the prediction error and ii) the bit category of the prediction error.

8. A method as in claim 4, wherein the method further comprises:
    performing a first binarization operation on the bit category of the prediction error at that pixel to produce a first binarized string; and
    performing a second binarization operation on the relative absolute value of the prediction error at that pixel to produce a second binarized string.

9. A method as in claim 8, wherein performing the first binarization operation on the bit category of the prediction error at each pixel includes computing a unary representation of the bit category of the prediction error at that pixel.

10. A method as in claim 8, wherein performing the second binarization operation on the relative absolute value of the prediction error includes:
    computing a unary representation of the relative absolute value of the prediction error when the bit category of the prediction error is less than or equal to a bit category threshold value; and
    computing a uniform binary representation of the relative absolute value of the prediction error when the bit category of the prediction error is greater than the bit category threshold value.

11. A method as in claim 8, wherein encoding the prediction error based on the context model selected for each of the multiple factors includes:
    for a binarized string equal to one of the first binarized string and the second binarized string, for each bit position of the binarized string, forming a binary symbol from the binarized string and a number of previous binarized strings at that bit position;
    selecting a binary context model based on the binary symbols and the indices of the first context model, the third context model, and the fourth context model; and
    computing an estimated probability distribution for encoding the prediction error based on the binary context model.

12. A method as in claim 11, wherein forming the binary symbol from the binarized string and a number of previous binarized strings includes, at each bit position, concatenating the binary digits of the binarized string and the previous binarized strings at that bit position.

13. A computerized apparatus constructed and arranged to compress single color image data, the apparatus comprising:

memory for storing the single color image data; and controlling circuitry coupled to the memory, the controlling circuitry being constructed and arranged to:

generate, by the computerized device and for each pixel of the image, a prediction error equal to a difference between the single color image data at that pixel and a predicted value of the single color image data at that pixel;

separate the prediction error at each pixel into multiple factors;

select a respective context model for each of the multiple factors into which the prediction error at that pixel has been separated; and encode the prediction error at each pixel based the context model selected for each of the multiple factors to generate compressed image data.

14. An apparatus as in claim 13, wherein the multiple factors include (i) a sign of the prediction error at the respective pixel and (ii) an absolute value of the prediction error at that pixel; and wherein the controlling circuitry constructed and arranged to select the context model for each of the multiple factors is further constructed and arranged to:

select a first context model for the sign of the prediction error at that pixel; and select a second context model for the absolute value of the prediction error at that pixel.

15. An apparatus as in claim 14, wherein the controlling circuitry constructed and arranged to select the first context model for the sign of the prediction error is further constructed and arranged to identify, as the first context model, a context model of a set of sign context models based on respective signs of prediction errors at a pixel adjacent to and to the west of that pixel and at a pixel adjacent to and to the north of that pixel.

16. An apparatus as in claim 14, wherein the controlling circuitry constructed and arranged to separate the prediction error into multiple factors is further constructed and arranged to represent the absolute value of the prediction error as a pair including (i) a bit category of the prediction error and (ii) a relative absolute value of the prediction error, the bit category being the most significant bit of the absolute value of the prediction error, the relative absolute value being a difference between (i) the absolute value of the prediction error and (ii) a minimum value of the prediction error over all values of the prediction error having the bit category; and wherein the controlling circuitry constructed and arranged to select the second context model for the absolute value of the prediction error is further constructed and arranged to:

select a third context model for the bit category of the prediction error at that pixel; and select a fourth context model for the relative absolute value of the prediction error at that pixel.

17. An apparatus as in claim 16, wherein the controlling circuitry constructed and arranged to select the third context model for the bit category of the prediction error is further constructed and arranged to:

whether the prediction errors at pixels from a group of pixels are all zero to produce a testing result identifying one of a first set of bit category context models and a second set of bit category context models from which the third context model may be selected, the group of pixels containing the pixels adjacent to that pixel to the west, north, northwest, and northeast; and identify, as the third context model, a context model of one of the first set of bit category context models and the second set of bit category context models based on the testing result.

18. An apparatus as in claim 16, wherein the controlling circuitry constructed and arranged to select the third context model for the bit category of the prediction error is further constructed and arranged to generate a maximum of bit categories at a set of neighboring pixels, the set of neighboring pixels containing the pixels adjacent to that pixel to the west (W), north (N), northwest (NW), and northeast (NE), the set of neighboring pixels further containing the pixel adjacent to W to the west, the pixel adjacent to NW to the west, the pixel adjacent to N to the north, and the pixel adjacent to NW to the north.

19. An apparatus as in claim 16, wherein the controlling circuitry constructed and arranged to select the fourth context model for the relative absolute value of the prediction error is further constructed and arranged to select the index of the fourth context model based on i) the index of the third context model computed for the bit category of the prediction error at that pixel and ii) the bit category of the prediction error at that pixel.

20. A computer program product comprising a non-transitory, computer-readable storage medium which stores executable code, which when executed by a processor, causes the processor to perform a method of compressing single color image data stored in memory, the method comprising:

generating a prediction error equal to a difference between the single color image data at that pixel and a predicted value of the single color image data at that pixel;

separating the prediction error into multiple factors;

selecting a respective context model for each of the multiple factors into which the prediction error at that pixel has been separated; and encoding the prediction error based on the context model selected for each of the multiple factors to generate compressed image data.

* * * * *